United States Patent [19]
Todd

[11] Patent Number: 5,152,690
[45] Date of Patent: Oct. 6, 1992

[54] TRILINGUAL EDUCATIONAL BLOCK

[76] Inventor: Diane M. Todd, 5 Bunker Hill Dr., Howell, N.J. 07731

[21] Appl. No.: 666,202

[22] Filed: Mar. 7, 1991

[51] Int. Cl.⁵ ............................................. G09B 21/00
[52] U.S. Cl. ................................... 434/113; 434/112; 434/114; 434/115; 434/117
[58] Field of Search ................ 434/156, 159, 162-164, 434/112-117, 167, 168, 172, 403, 184; 273/272; 101/333, 327, 368, 372, 373, 405; 400/122

[56] References Cited
U.S. PATENT DOCUMENTS 4,378,215 3/1983 Sparks ................................. 434/113
4,846,687 7/1989 White et al. ........................ 434/113

Primary Examiner—Richard J. Apley
Assistant Examiner—Glenn E. Richman
Attorney, Agent, or Firm—James K. Luchs

[57] ABSTRACT

Six sided blocks contain visual and tactile letters and words in English, Braille and American Signa Language (ASL). Raised surfaces on the blocks can be inked and used for trilingual printing on paper. With two letters per block a set of thirteen blocks is suitable for learning by hearing, deaf blind and deaf/blind. Adjacent sides of a block can serve to represent ASL signs which require movement or two hand positions.

6 Claims, 4 Drawing Sheets

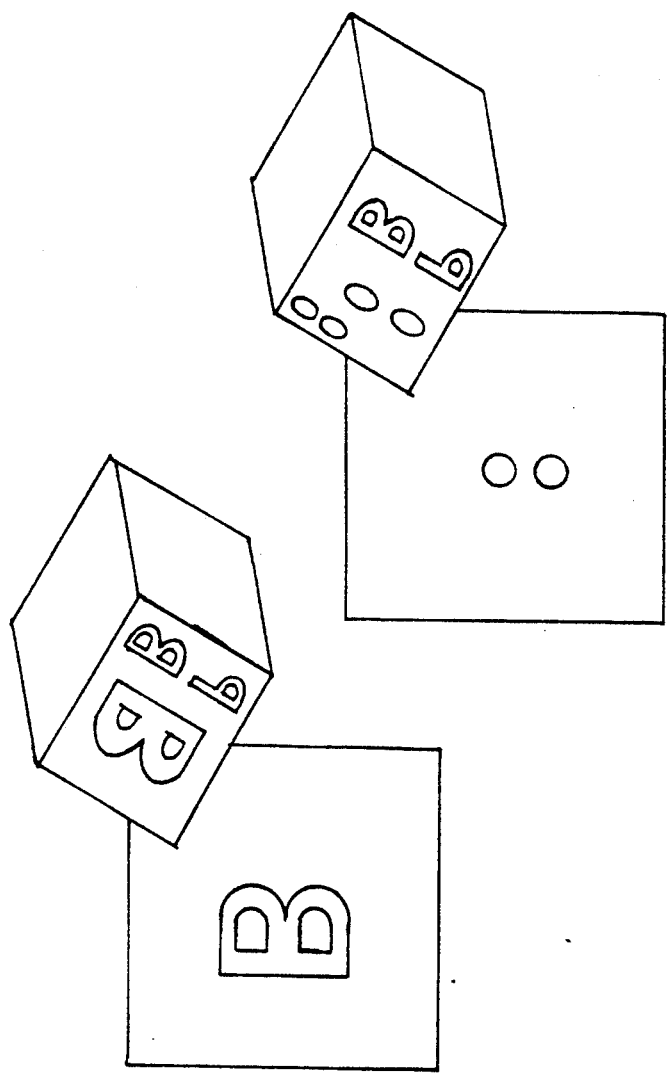
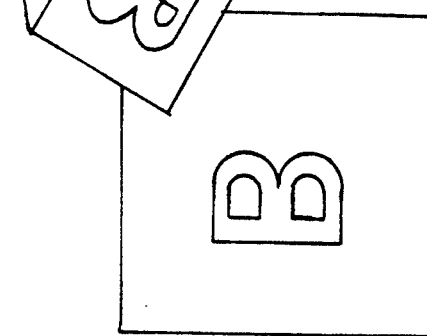
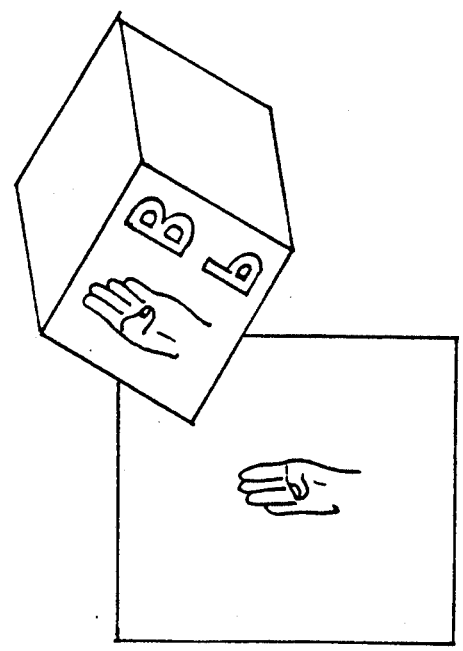
FIG. 2C
FIG. 2B
FIG. 2A

TRILINGUAL EDUCATIONAL BLOCK

FIELD OF THE INVENTION

The invention relates to educational and play blocks. In particular, the invention relates to blocks which contain letters and signs in English, Braille and American Sign Language (ASL).

BACKGROUND OF THE INVENTION

Play and educational blocks, both with and without raised letters, have been known since the time of Colonial America. While such blocks were originally made from wood, it is now more feasible to mold such blocks from plastic.

Many separate educational devices have come to be adapted which meet the separate needs of children or adults who must learn English, Braille or sign language. Yet in spite of what was previously available, a need still existed for a trilingual link for these three languages which would be attractive to the young.

SUMMARY OF THE INVENTION

It is an object of the invention to provide trilingual blocks for play and/or education comprising a set of thirteen blocks with two letters per block.

The blocks are visual and tactile thereby providing a means for aiding the hearing, deaf, blind and deaf/blind since each letter is represented in English, Braille and American Sign Language (ASL).

BRIEF DESCRIPTION OF THE DRAWINGS

FIG. 2A, FIG. 2B and FIG. 2C—Three printing blocks are illustrated where an ink print on paper has been transferred from the raised surface on each block.

DETAILED DESCRIPTION OF THE INVENTION

The absence of adequate means for education of the deaf and hearing impaired provided motivation for the new means of education/play provided by the invention. While high technology computer systems have been developed which can aid in deaf and hearing impaired education, these are too expensive for schools funded by public taxation. In contrast to such high tech devices which benefit only a minority of students, it is an object of the invention to provide an education/play means which can be readily manufactured and placed in widespread use in schools as well as be purchased by parents for their children for use in the home. Since many parents of deaf children are of limited means and receive no government subsidy, a need has existed for a means for education in the home which would be affordable as well as practical without requiring a home computer.

A need has existed for an enjoyable means to promote learning between and among the impaired and the nonimpaired. Both children and adults can benefit from the trilingual aid provided by the visual and tactile blocks of the invention. The trilingual blocks acquaint the hearing population with the languages of the deaf and blind and provide an incentive for them to learn these visual and tactile skills.

A particular need exists for the deaf and the blind in making the learning process as enjoyable as possible. Learning tools are much more limited for them than for the nonimpaired school population.

A distinctive feature of the trilingual blocks of the invention is the presence of tactile surfaces which are not only detectable by touch, but further serve as stamps for printing to allow English letters and Braille symbols and fingerspelling to be stamped onto paper. With the use of an ink pad this enables the user to "write" in English, Braille and ASL and combinations thereof. Thus with the thirteen blocks it would be possible to stamp out a word in all three languages by selecting the correct surface to use by either visual or tactile means.

DETAILED DESCRIPTION OF THE DRAWINGS

Figure 1A:
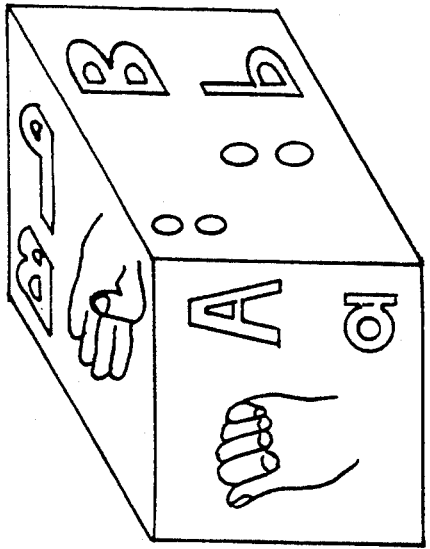
FIG. 1A, FIG. 1B and FIG. 1C—Three views of a six sided printing block for English, Braille and American Sign Language are illustrated. Both A and B can be printed in English, Braille and American Sign Language by using one side of the block.
Figure 1B:
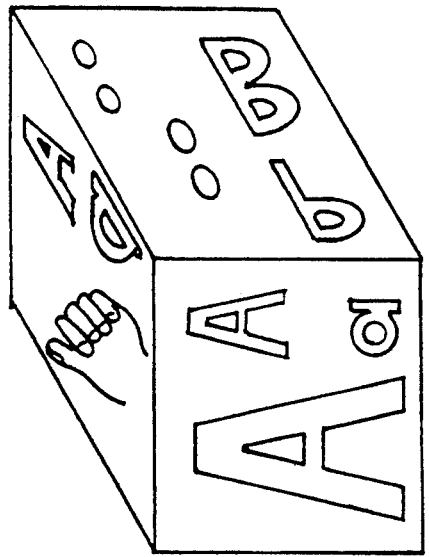
Figure 1C:
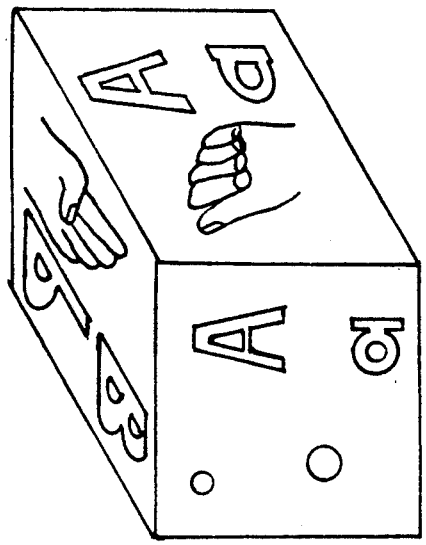

FIG. 1 Three views are provided of the same block on which A and B are present in both visual and tactile form in English, Braille and ASL. For the benefit of the blind student the six surfaces each have a tactile representation, i.e. two English letters, two Braille symbols and two hand signs for the A and B.

FIG. 2 The use of a block to print the English, Braille and ASL letter B is illustrated where the block would be in the process of being removed from the paper after transferring the ink to the paper.

Figure 3B:
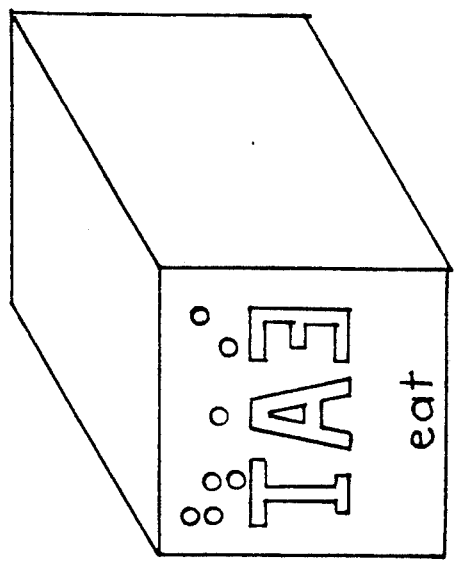
FIG. 3A and FIG. 3B—Raised printing surfaces for the American Sign Language word eat and the reversed English word EAT are shown.
Figure 3A:
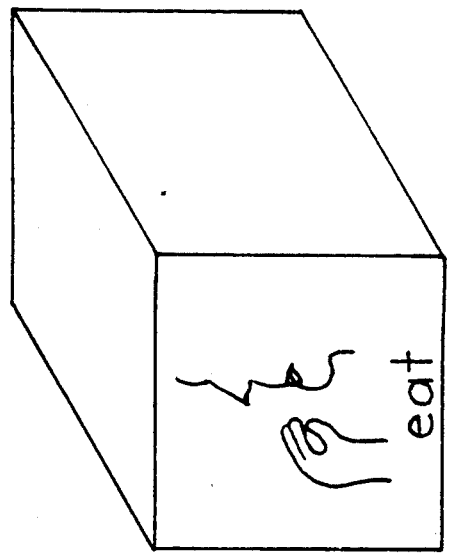

FIG. 3 The left block shows the ASL sign for the word EAT where the word is also written in English. The right block can bring the English word EAT from either a raised surface on where the ink will only be accepted and print from that area. The word EAT is present in both Braille and English, but printing does not occur from these areas.

Figure 4:
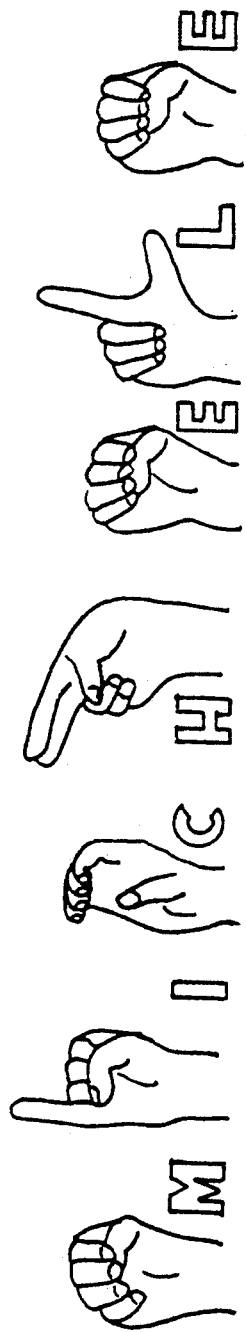

FIG. 4 Illustrated is a cut and paste school project in which copies of fingersigns are put together to spell the name of the student.

While the trilingual blocks represent a preferred mode for the invention, the concept is not limited to a set of thirteen blocks with two letters per block. It would also be practical to have only one letter of the alphabet on a block and/or short words such that the block could be used to print both in Braille and ASL letters such as B and G along with the words BOY and GIRL and the ASL signs for BOY and GIRL. In the case where an ASL sign requires a combination such as HOME, the EAT sign could be placed on a side directly adjacent to a side with the SLEEP sign so that movement of the block between EAT/SLEEP would allow visualization of HOME. Side by side signs could also be used on the blocks where the hand or hands must move to convey the concept of direction, tense, time, etc. In addition to or as an alternative a hand sign on a side of a block may incorporate an arrow to shown the direction which the hand or hands must move to complete the sign.

A different concept involves the use of a block to represent a sign which has multiple meanings in English, or conversely a simple English word such as GET which must be represented by various ASL signs. In this mode of the invention these trilingual differences could be learned by both the impaired and nonimpaired.

EXAMPLE 1

A preferred design and practice of the use of the education/play blocks according to the invention is essentially as illustrated in FIGS. 1, 2 and 3.

EXAMPLE 2

In the education of deaf students it is common practice to copy pictures of signs and cut and paste these together in the manner illustrated in FIG. 4. What is shown is an actual copy of a school project.

EXAMPLE 3

The printing blocks as illustrated in FIGS. 1, 2 and 3 can be used for a common practice of placing sign language names and hand signs such as "I LOVE YOU" on tee shirts and sweat shirts. These printing blocks represent an improvement over current methods of handpainting or using stencils or transfers.

EXAMPLE 4

As illustrated in FIGS. 1, 2 and 3 where the printing block produces the outline of a handsign or a letter this could be embroidered or painted on a tee shirt or sweat shirt.

EXAMPLE 5

As an alternative to ink printing on paper, the blocks serve to imprint clay or silicone thixotropic polymer for purposes of play and education.

EXAMPLE 6

In the case where the block surface is recessed rather than raised, the block can be pressed into dough prior to baking such that a raised tactile surface is produced on the baked goods.

What is claimed is:

1. A wood or plastic block for educational purposes having surfaces with multiple representations in English and American Sign Language (ASL), the block comprising at least one tactile English or ASL representation on each of its six sides, the block further comprising at least one reversed English or ASL representation on each of its six sides, whereby either English or ASL representations can be printed on paper from inked surfaces on the block.

2. The block of claim 1, further characterized in that the block has tactile and visual Braille representations to correspond to the English and ASL on the block surfaces whereby Braille can be printed in addition to English and ASL.

3. The block of claim 2, further characterized in that at least one side of the block contains an ASL hand sign other than the fingerspelling of a letter of the alphabet.

4. The block of claim 3, further characterized in that at least one side of the block contains an English word.

5. The block of claim 1, further characterized in that two adjacent sides of the block contain ASL words which together represent another ASL word.

6. The block of claim 5, further characterized in that movement of the block while looking at the two adjacent sides provides the representation of the ASL word as it is signed.

* * * * *